US010616383B2

United States Patent
Mobasher et al.

(10) Patent No.: US 10,616,383 B2
(45) Date of Patent: *Apr. 7, 2020

(54) SYSTEM AND METHOD FOR ELECTRONIC DATA COMMUNICATION

(71) Applicant: Samsung Display Co., Ltd., Yongin, Gyeonggi-do (KR)

(72) Inventors: Amin Mobasher, San Jose, CA (US); Jalil Kamali, San Jose, CA (US); Gregory W. Cook, San Jose, CA (US); David Zamora, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,564

(22) Filed: Nov. 22, 2016

(65) Prior Publication Data

US 2018/0091634 A1    Mar. 29, 2018

Related U.S. Application Data

(60) Provisional application No. 62/400,042, filed on Sep. 26, 2016.

(51) Int. Cl.
*H04L 29/08*    (2006.01)
*H04N 21/41*    (2011.01)
(Continued)

(52) U.S. Cl.
CPC .......... *H04L 69/324* (2013.01); *H04L 1/0003* (2013.01); *H04L 1/0006* (2013.01);
(Continued)

(58) Field of Classification Search
CPC ... H04L 69/324; H04L 1/0003; H04L 1/0006; H04L 1/0041; H04N 5/40; H04N 7/0255; H04N 7/0357; H04W 28/0268
(Continued)

(56) References Cited

U.S. PATENT DOCUMENTS 6,754,277 B1   6/2004   Heinzelman et al.
7,076,104 B1 *  7/2006   Keith .................... G06F 17/148
                                              375/E7.043
(Continued)

FOREIGN PATENT DOCUMENTS

WO   WO 2007/031090 A1   3/2007
WO   WO 2013/048228 A1   4/2013
WO   WO 2015/102406 A1   7/2015

OTHER PUBLICATIONS

Khan, S., et al., "Application-Driven Cross-Layer Optimization for Video Streaming over Wireless Networks", Jan. 2006, pp. 122-130, IEEE Communications Magazine.
(Continued)

*Primary Examiner* — Paulos M Natnael
*Assistant Examiner* — Sean N. Haiem
(74) *Attorney, Agent, or Firm* — Lewis Roca Rothberger Christie LLP

(57) ABSTRACT

In a method for transmitting video for a display panel between a transmitter in electronic communication with a receiver over a wireless communication channel, the method includes: receiving, by a transmitter, a frame of video data from a data source; reorganizing, by the transmitter, the frame of video data into a plurality of packets according to levels of importance of bits of the frame of video data; generating, by the transmitter, a tag for each of the packets, the tags corresponding to different relatively levels of importance of the packets; performing, by the transmitter, different protection techniques for each of the packets based on the tag corresponding to each of the packets; and transmitting, by the transmitter, the packets and the tags to the receiver for display on the display panel such that each packet is transmitted according to the different protection techniques based on their corresponding tagging.

16 Claims, 9 Drawing Sheets

(51) Int. Cl.
  *H04L 1/00* (2006.01)
  *H04N 21/4363* (2011.01)
  *H04N 21/436* (2011.01)
  *H04N 5/40* (2006.01)
  *H04N 7/025* (2006.01)
  *H04N 7/035* (2006.01)
  *H04W 28/02* (2009.01)
  *H04L 1/18* (2006.01)

(52) U.S. Cl.
  CPC ............ *H04L 1/007* (2013.01); *H04L 1/0009* (2013.01); *H04L 1/0041* (2013.01); *H04L 1/0083* (2013.01); *H04L 1/0086* (2013.01); *H04N 5/40* (2013.01); *H04N 7/0255* (2013.01); *H04N 7/0357* (2013.01); *H04N 21/4122* (2013.01); *H04N 21/43615* (2013.01); *H04N 21/43637* (2013.01); *H04W 28/0268* (2013.01); *H04L 1/1825* (2013.01)

(58) Field of Classification Search
  USPC ............ 348/474; 370/392, 312; 375/240.16, 375/295; 709/231
  See application file for complete search history.

(56) References Cited

U.S. PATENT DOCUMENTS

| | | | |
|---|---|---|---|
| 7,237,039 B2 | 6/2007 | Leon et al. | |
| 7,406,522 B2 | 7/2008 | Riddle | |
| 7,509,687 B2* | 3/2009 | Ofek | G06F 21/14 |
| | | | 709/227 |
| 7,580,356 B1 | 8/2009 | Mishra et al. | |
| 7,688,981 B2 | 3/2010 | Halasz et al. | |
| 7,814,184 B2 | 10/2010 | Mandato et al. | |
| 7,839,852 B2 | 11/2010 | Liu et al. | |
| 8,009,609 B2 | 8/2011 | Hoekstra et al. | |
| 8,095,736 B2 | 1/2012 | Rossi | |
| 8,189,659 B2 | 5/2012 | Han et al. | |
| 8,553,769 B2 | 10/2013 | He et al. | |
| 8,824,543 B2 | 9/2014 | Wu et al. | |
| 8,897,359 B2 | 11/2014 | Regunathan et al. | |
| 9,014,263 B2 | 4/2015 | Leontaris et al. | |
| 9,106,928 B2 | 8/2015 | Jung et al. | |
| 9,113,371 B2 | 8/2015 | Sun et al. | |
| 9,210,446 B2 | 12/2015 | Kumar et al. | |
| 9,226,137 B2 | 12/2015 | Anantharaman et al. | |
| 9,326,286 B2 | 4/2016 | Dinan | |
| 9,407,734 B2 | 8/2016 | Ashokan et al. | |
| 2003/0156645 A1* | 8/2003 | Cohen | H04N 19/139 |
| | | | 375/240.16 |
| 2006/0282748 A1* | 12/2006 | Bader | H04H 20/30 |
| | | | 714/776 |
| 2007/0198887 A1* | 8/2007 | Reznic | H03M 13/35 |
| | | | 714/752 |
| 2008/0165083 A1* | 7/2008 | Brodersen | H04N 7/163 |
| | | | 345/3.3 |
| 2008/0253462 A1* | 10/2008 | Singh | H04L 1/0003 |
| | | | 375/240.25 |
| 2008/0285091 A1* | 11/2008 | Skaaksrud | G06Q 10/08 |
| | | | 358/473 |
| 2009/0103635 A1* | 4/2009 | Pahalawatta | H04L 1/007 |
| | | | 375/240.27 |
| 2009/0110108 A1* | 4/2009 | Kennedy | H04B 1/71635 |
| | | | 375/295 |
| 2010/0278230 A1* | 11/2010 | MacInnis | H04N 19/172 |
| | | | 375/240.02 |
| 2010/0284457 A1 | 11/2010 | Blanch Perez de Notario | |
| 2011/0044338 A1* | 2/2011 | Stahl | H04L 1/1607 |
| | | | 370/392 |
| 2012/0250690 A1* | 10/2012 | Suh | H04N 21/2381 |
| | | | 370/392 |
| 2013/0070859 A1 | 3/2013 | Lu et al. | |
| 2013/0128947 A1 | 5/2013 | Fryer et al. | |
| 2013/0194386 A1 | 8/2013 | Leontaris et al. | |
| 2013/0194505 A1* | 8/2013 | Pahalawatta | H04N 5/21 |
| | | | 348/607 |
| 2013/0203400 A1 | 8/2013 | Ricci | |
| 2013/0308056 A1* | 11/2013 | Kim | H04N 19/67 |
| | | | 348/617 |
| 2013/0308648 A1* | 11/2013 | Shamis | H04L 2/465 |
| | | | 370/395.53 |
| 2014/0025839 A1* | 1/2014 | Marko | H04H 20/42 |
| | | | 709/231 |
| 2014/0192641 A1 | 7/2014 | Yonge, III et al. | |
| 2014/0258552 A1* | 9/2014 | Oyman | H04N 19/146 |
| | | | 709/231 |
| 2014/0286226 A1* | 9/2014 | Seok | H04W 56/00 |
| | | | 370/312 |
| 2015/0063445 A1 | 3/2015 | Rose et al. | |
| 2015/0103928 A1 | 4/2015 | Seregin et al. | |
| 2015/0195561 A1 | 7/2015 | Wang et al. | |
| 2015/0281709 A1 | 10/2015 | Bracha et al. | |
| 2016/0014420 A1 | 1/2016 | Su et al. | |
| 2016/0057647 A1 | 2/2016 | Sullivan et al. | |
| 2016/0173939 A1 | 6/2016 | Iwami et al. | |
| 2016/0191159 A1* | 6/2016 | Aoyama | H04N 21/436 |
| | | | 398/172 |
| 2016/0191931 A1 | 6/2016 | Hannuksela | |

OTHER PUBLICATIONS

Rao Santhosha, et al., "Cross Layer Protocols for Multimedia Transmission in Wireless Networks", International Journal of Computer Science and Engineering Survey, vol. 3, No. 3, Jun. 2012, pp. 15-28.
Hama Amin, Rebeen R., "Video QoS/QoE over IEEE802.11n/ac: A Contemporary Survey", RIT Scholar Work, Thesis, 2016, 84 pgs., Rochester Institute of Technology.
Redieteab, Getachew, "Cross-layer Optimization for Next Generation Wi-Fi", Thesis, 2012, 221 pgs., National Institute of Applied Sciences (INSA) of Rennes.
Parois, Ronan et al.; "Real-time UHD Scalable multi-layer HEVC encoder architecture"; Dec. 1, 2016; 24 European Signal Processing Conference; pp. 1298-1302.
Tsai, Chia-Ming et al.; "Joint-layer Encoder Optimization for HEVC Scalable Extensions"; SPIE Optical Engineering Application; International Society for Optics and Photonics; Sep. 23, 2014, 8 pages.
Lte: "3rd Generation Partnership Project; Technical Specification Group Radio Access Network; Evolved Universal Terrestrial Radio Access (E-UTRA); Packet Data Convergence Protocol (PDCP) specification (Release 13)", 3GPP TS 36.323 Version 13.0.0, Dec. 2015, 36 pages.
Skordoulis, Dionysios, et al., "IEEE 802.11n MAC Frame Aggregation Mechanisms for Next-Generation High-Throughput WLANS [Medium Access Control Protocols for Wireless LANs]", IEEE Wireless Communications, Feb. 2008, pp. 40-47.
EPO Extended Search Report dated Feb. 5, 2018, for corresponding European Patent Application No. 17192245.3 (8 pages).
EPO Extended Search Report dated Feb. 8, 2018, for corresponding European Patent Application No. 17193329.4 (12 pages).
U.S. Office Action dated Apr. 6, 2018, issued in U.S. Appl. No. 15/359,551 (11 pages).
U.S. Notice of Allowance dated May 16, 2018 issued in U.S. Appl. No. 15/359,553 (9 pages).
U.S. Notice of Allowance dated Nov. 27, 2018, issued in U.S. Appl. No. 15/481,433 (9 pages).
U.S. Notice of Allowance dated Feb. 6, 2019, issued in U.S. Appl. No. 15/359,551 (8 pages).
Capano, Daniel E., Understanding modulation and coding schemes, Control Engineering, XP055584748, https://www.controleng.com/articles/understanding-modulation-and-coding-schemes, Dec. 19, 2014, pp. 1-8.
European Office Action for corresponding European Application No. 17 193 329.4, dated May 7, 2019, 4 pages.
European Patent Office Summons to Attend Oral Proceedings for corresponding European Patent Application No. 17 193 329.4, dated Nov. 5, 2019, 7 pages.

(56) References Cited

OTHER PUBLICATIONS

Hong, Seung-Eun, et al.; Flexible Unequal Error Protection Scheme for Uncompressed Video Transmission over 60GHz Multi-Gigabit Wireless System, Computer Communications and Networks (ICCCN), 2011 Proceedings of the 20th International Conference ON, IEEE, Jul. 31, 2011 6 pages.

European Patent Office summons to attend oral proceedings pursuant to Rule 115(1) EPC, for Patent Application No. 17192245.3, dated Jun. 25, 2019, 6 pages.

Schäfer, Ralf et al., "Digital Video Coding Standards and Their Role in Video Communications", Proceedings of the IEEE, Jun. 1995, pp. 907-924, vol. 83, No. 6, IEEE.

U.S. Office Action dated Jul. 3, 2019, for U.S. Appl. No. 16/126,979, 11 pages.

Notice of Allowance issued in U.S. Appl. No. 15/359,551 by the USPTO, dated Sep. 23, 2019, 8 pages.

\* cited by examiner

SYSTEM AND METHOD FOR ELECTRONIC DATA COMMUNICATION

CROSS-REFERENCE TO RELATED APPLICATIONS

The present application claims priority to and the benefit of U.S. Provisional Patent Application No. 62/400,042, entitled "A SYSTEM AND METHOD FOR CROSS LAYER IMAGE OPTIMIZATION (CLIO) FOR WIRELESS VIDEO TRANSMISSION OVER MULTI-GIGABIT CHANNELS", filed in the United States Patent and Trademark Office on Sep. 26, 2016, the entire content of which is incorporated herein by reference. The present application is further related to U.S. Patent Application entitled "System and Method for Electronic Data Communication" Ser. No. 15/359,553, and U.S. Patent Application entitled "System and Method for Electronic Data Communication" Ser. No. 15/359,551, both filed on even date herewith, the entire content of both of which is incorporated herein by reference.

FIELD

Aspects of one or more example embodiments of the present invention relate to a system and method for electronic data communication.

BACKGROUND

The demand for video transmission over wireless is increasing due to advent of new applications and use cases. Technological advancements in high resolution display screens and the advent of high quality video (HD, FHD, UHD, etc.) have resulted in increased bandwidth requirements for high throughput transmissions over recent years. For example, uncompressed Ultra High Definition (UHD) video requires 12 Gbps of bandwidth.

In addition to high data rate constraints, wireless video transmission is also time/delay sensitive. When provided with 60 frames per second, the inter-frame time is $\frac{1}{60}$=16.6 ms. Thus, any portion of a frame not received within 16.6 ms must be dropped so that the display can begin rendering the next frame, and data retransmission is typically not a viable option. In addition to high bandwidth and latency requirements, wireless channels may be susceptible to interference, which may cause the quality of a wireless channel to vary unpredictably over time. Thus, it may be difficult to provide a guaranteed Quality of Service (QoS) for sending high quality video data over wireless channel.

The above information discussed in this Background section is only for enhancement of understanding of the background of the described technology and therefore it may contain information that does not constitute prior art that is already known to a person having ordinary skill in the art.

SUMMARY

Aspects of one or more example embodiments of the present invention relate to a system and method for electronic data communication.

According to some example embodiments, in a method for transmitting video for a display panel between a transmitter in electronic communication with a receiver over a wireless communication channel, the method includes: receiving, by a transmitter, a data signal from a data source; receiving, by the transmitter, a return signal from a receiver; selecting, by the transmitter based on at least one of channel quality, video quality, codec requirements, or data rate requirements, a profile from among a plurality of profiles each comprising one or more parameters for transmitting the data signal to the receiver, the plurality of profiles comprising one or more profiles corresponding to transmission of uncompressed video data and one or more profiles corresponding to transmission of compressed video data; and transmitting, by the transmitter, the data signal to the receiver according to the selected profile for display on the display panel.

According to some embodiments, the data signal received by the transmitter is a video data signal.

According to some embodiments, the method further includes selecting the profile from among the plurality of profiles based on the return signal, wherein the return signal comprises an indicator of a quality of the wireless communication channel as measured by the receiver.

According to some embodiments, the method further includes selecting the profile from among the plurality of profiles based on the return signal, wherein the return signal comprises an indicator of visual quality as measured by the receiver.

According to some embodiments, the method further includes identifying, based on the return signal, a display device corresponding to the receiver; and selecting, by the transmitter, the profile based on the display device corresponding to the receiver.

According to some embodiments, the plurality of profiles comprises one or more of the following: a first profile defining parameters for transmitting uncompressed video data in which a channel quality exceeds a first threshold level, such that if pixel data from any pixel from a group of pixels is lost at the receiver after transmission, the receiver recalculates the lost pixel data by averaging values of surrounding pixels; a second profile defining parameters for transmitting uncompressed video data in which a channel quality is below the first threshold level but above a second threshold level, such that the pixel data from one pixel of a group of pixels is not transmitted to the receiver and the receiver recalculates the pixel data from the one pixel by averaging values of surrounding pixels; a third profile defining parameters for transmitting uncompressed video data in which a channel quality is below the first threshold level and the second threshold level but above a third threshold level, such that a least significant bit of pixels in a packet is not transmitted to the receiver and the receiver compensates for the least significant bit; fourth, fifth, sixth, and seventh profiles defining parameters for transmitting compressed video data compressed using a layer-based compression method that generates a plurality of data layers, the plurality of data layers comprising a highest layer having a first compression ratio, and a lowest layer having data that, if added to the highest layer and any intervening layers has a second compression ratio lower than the first compression ratio, wherein: according to the fourth profile, each of the data layers is transmitted to the receiver; according to the fifth profile, a subset of the data layers is transmitted to the receiver; according to the sixth profile, a single data layer from among the data layers is transmitted to the receiver; and according to the seventh profile, only a portion of one or more of the data layers is transmitted to the receiver; and an eighth profile defining parameters for transmitting video data with different priority levels based on a display device for displaying the video data.

According to some embodiments, the method further includes transmitting, by the transmitter, information regarding the selected profile to the receiver by a bit selection in a header packet of the data signal.

According to some embodiments, the information regarding the selected profile comprises at least one of decompression, reverse layering, decoding, or error correction information corresponding to the selected profile.

According to some example embodiments of the present invention, in a transmitter for transmitting data for a display panel to a receiver over a wireless communication channel, the transmitter is configured to: receive a data signal from a data source; receive a return signal from a receiver; select, based on at least one of channel quality, video quality, codec requirements, or data rate requirements, a profile from among a plurality of profiles each comprising one or more parameters for transmitting the data signal to the receiver, the plurality of profiles comprising one or more profiles corresponding to transmission of uncompressed video data and one or more profiles corresponding to transmission of compressed video data; and transmit the data signal to the receiver according to the selected profile for display on the display panel.

According to some embodiments, the data signal received by the transmitter is a video data signal.

According to some embodiments, the transmitter is further configured to select the profile from among the plurality of profiles based on the return signal, wherein the return signal comprises an indicator of a quality of the wireless communication channel as measured by the receiver.

According to some embodiments, the transmitter is further configured to: identify, based on the return signal, a display device corresponding to the receiver; and select the profile based on the display device corresponding to the receiver.

According to some embodiments, the plurality of profiles includes one or more of the following: a first profile defining parameters for transmitting uncompressed video data in which a channel quality exceeds a first threshold level, such that if pixel data from any pixel from a group of pixels is lost at the receiver after transmission, the receiver recalculates the lost pixel data by averaging values of surrounding pixels; a second profile defining parameters for transmitting uncompressed video data in which a channel quality is below the first threshold level but above a second threshold level, such that the pixel data from one pixel of a group of pixels is not transmitted to the receiver and the receiver recalculates the pixel data from the one pixel by averaging values of surrounding pixels; a third profile defining parameters for transmitting uncompressed video data in which a channel quality is below the first threshold level and the second threshold level but above a third threshold level, such that a least significant bit of pixels in a packet is not transmitted to the receiver and the receiver compensates for the least significant bit; fourth, fifth, sixth, and seventh profiles defining parameters for transmitting compressed video data compressed using a layer-based compression method that generates a plurality of data layers, the plurality of data layers comprising a highest layer having a first compression ratio, and a lowest layer having data that, if added to the highest layer and any intervening layers has a second compression ratio lower than the first compression ratio, wherein: according to the fourth profile, each of the data layers is transmitted to the receiver; according to the fifth profile, a subset of the data layers is transmitted to the receiver; according to the sixth profile, a single data layer from among the data layers is transmitted to the receiver; and according to the seventh profile, only a portion of one or more of the data layers is transmitted to the receiver; and an eighth profile defining parameters for transmitting video data with different priority levels based on a display device for displaying the video data.

According to some embodiments, the transmitter is further configured to transmit information regarding the selected profile to the receiver by a bit selection in a header packet of the data signal, wherein the information regarding the selected profile comprises at least one of decompression, reverse layering, decoding, or error correction information corresponding to the selected profile.

According to some embodiments of the present invention, in a method for transmitting video for a display panel between a transmitter in electronic communication with a receiver over a wireless communication channel, the method includes: receiving, by a transmitter, a data signal from a data source; receiving, by the transmitter, a return signal from a receiver; selecting, by the transmitter, a profile from among a plurality of profiles each comprising one or more parameters for transmitting the data signal to the receiver, the plurality of profiles comprising one or more profiles corresponding to transmission of uncompressed video data and one or more profiles corresponding to transmission of compressed video data; and transmitting, by the transmitter, the data signal to the receiver according to the selected profile for display on the display panel.

According to some embodiments, the method further includes selecting the profile based on channel quality.

According to some embodiments, the method further includes selecting the profile based on video quality as measured at the receiver.

According to some embodiments, the method further includes selecting the profile based on codec requirements.

According to some embodiments, the method further includes selecting the profile based on data rate requirements.

According to some embodiments, the method further includes identifying, based on the return signal, a display device corresponding to the receiver; and selecting, by the transmitter, the profile based on the display device corresponding to the receiver.

According to some embodiments, the method further includes monitoring, by the transmitter, the return signal from the receiver; and selecting, by the transmitter, another profile for subsequent transmission based on a change in at least one of channel quality or video quality.

According to some example embodiments of the present invention, in method for transmitting video for a display panel between a transmitter in electronic communication with a receiver over a wireless communication channel, the method includes: receiving, by a transmitter, a frame of video data from a data source; grouping, by the transmitter, bits corresponding to the frame of video data into a plurality of groups each corresponding to a plurality of levels of importance; reorganizing, by the transmitter, the groups in order of importance to generate a reorganized frame of data with a group corresponding to a plurality of packet headers having a highest level of importance and arranged to be first among the groups; inserting, by the transmitter, a value indicating a length of data bits corresponding to each packet header before each packet header; and transmitting, by the transmitter, the bits corresponding to the frame of video data to the receiver for display on the display panel such that each group from among the plurality of groups is transmitted according to different protection techniques based on their corresponding levels of importance.

According to some embodiments, each group has a different modulation and coding scheme (MCS) value based on their corresponding level of importance.

According to some embodiments, each group has a different forward error correction coding rate based on their corresponding level of importance.

According to some embodiments, a decoder at the receiver is configured to reconstruct the frame of video data.

According to some embodiments, reconstructing the frame of video data comprises moving each packet header to their original relative locations.

According to some embodiments, reconstructing the frame of video data comprises removing the value indicating the length of data bits.

According to some embodiments, the method further includes monitoring, by the transmitter, a return signal from the receiver; and adjusting, by the transmitter, the different protection techniques for subsequent transmission.

According to some embodiments, the method further includes selecting, by the transmitter, the different protection techniques according to a type of display device corresponding to the receiver.

According to some example embodiments of the present invention, in a transmitter for transmitting data for a display panel to a receiver over a wireless communication channel, the transmitter is configured to: receive a frame of video data from a data source; group bits corresponding to the frame of video data into a plurality of groups each corresponding to a plurality of levels of importance; reorganize the groups in order of importance to generate a reorganized frame of data with a group corresponding to a plurality of packet headers having a highest level of importance and arranged to be first among the groups; insert a value indicating a length of data bits corresponding to each packet header before each packet header; and transmit the bits corresponding to the frame of video data to the receiver for display on the display panel such that each group from among the plurality of groups is transmitted according to different protection techniques based on their corresponding levels of importance.

According to some embodiments, each group has a different modulation and coding scheme (MCS) value based on their corresponding level of importance.

According to some embodiments, each group has a different forward error correction coding rate based on their corresponding level of importance.

According to some embodiments, a decoder at the receiver is configured to reconstruct the frame of video data by moving each packet header to their original relative locations.

According to some embodiments, the transmitter is further configured to: monitor a return signal from the receiver; and adjust the different protection techniques for subsequent transmission.

According to some example embodiments of the present invention, in a method for transmitting video for a display panel between a transmitter in electronic communication with a receiver over a wireless communication channel, the method includes: receiving, by a transmitter, a frame of video data from a data source; grouping, by the transmitter, bits corresponding to the frame of video data into a plurality of groups each corresponding to a plurality of levels of importance; reorganizing, by the transmitter, the groups in order of importance to generate a reorganized frame of data with a group corresponding to a plurality of packet headers having a highest level of importance and arranged to be first among the groups; and transmitting, by the transmitter, the bits corresponding to the frame of video data to the receiver for display on the display panel such that each group from among the plurality of groups is transmitted according to different protection techniques based on their corresponding levels of importance.

According to some embodiments, the method further includes inserting, by the transmitter, a value indicating a length of data bits corresponding to each packet header before each packet header.

According to some embodiments, each group has a different modulation and coding scheme (MCS) value based on their corresponding level of importance.

According to some embodiments, each group has a different forward error correction coding rate based on their corresponding level of importance.

According to some embodiments, a decoder at the receiver is configured to reconstruct the frame of video data.

According to some embodiments, the method further includes: monitoring, by the transmitter, a return signal from the receiver; and adjusting, by the transmitter, the different protection techniques based on a change in at least one of channel quality or video quality for subsequent transmission.

According to some embodiments, the method further includes selecting, by the transmitter, the different protection techniques for data corresponding to different regions of an image according to a type of display device corresponding to the receiver.

According to some example embodiments of the present invention, in a method for transmitting video for a display panel between a transmitter in electronic communication with a receiver over a wireless communication channel, the method includes: receiving, by a transmitter, a frame of video data from a data source; reorganizing, by the transmitter, the frame of video data into a plurality of packets according to levels of importance of bits of the frame of video data; generating, by the transmitter, a tag for each of the packets, the tags corresponding to different relatively levels of importance of the packets; performing, by the transmitter, different protection techniques for each of the packets based on the tag corresponding to each of the packets; and transmitting, by the transmitter, the packets and the tags to the receiver for display on the display panel such that each packet is transmitted according to the different protection techniques based on their corresponding tagging.

According to some embodiments, the tag of each of the packets comprises adding a bit pattern indicating a relative importance level of a packet to a header of the packet.

According to some embodiments, the tag of each packet corresponds to a modulation and coding scheme (MCS) value based on their corresponding level of importance.

According to some embodiments, more important packets have a lower MCS value than less important packets.

According to some embodiments, the tag of each packet corresponds to a forward error correction coding rate based on their corresponding level of importance.

According to some embodiments, the method further includes: packing, by the transmitter, the packets into a plurality of Aggregated MAC Protocol Data Unit (A-MPDU) subframes; and transmitting, by the transmitter, the A-MPDU subframes to the receiver.

According to some embodiments, the method further includes tagging, by the transmitter, a plurality of Physical Layer Convergence Procedure (PLCP) Protocol Data Unit (PPDU) frames with a same tag; packing, by the transmitter, the A-MPDU subframes having a same importance level into the PPDU frames; and transmitting, by the transmitter, the PPDU frames to the receiver.

According to some embodiments, the method further includes selecting, by the transmitter, the different protection techniques for different regions of an image of the frame of video data according to a type of display device corresponding to the receiver.

According to some embodiments, in a transmitter for transmitting data for a display panel to a receiver over a wireless communication channel, the transmitter is configured to: receive a frame of video data from a data source; reorganize the frame of video data into a plurality of packets according to levels of importance of bits of the frame of video data; generate a tag for each of the packets, the tags corresponding to different relatively levels of importance of the packets; perform different protection techniques for each of the packets based on the tag corresponding to each of the packets; and transmit the packets and the tags to the receiver for display on the display panel such that each packet is transmitted according to the different protection techniques based on their corresponding tagging.

According to some embodiments, the tagging of each of the packets comprises adding a bit pattern indicating a relative importance level of a packet to a header of the packet.

According to some embodiments, the tagging of each packet corresponds to a modulation and coding scheme (MCS) value based on their corresponding level of importance.

According to some embodiments, the tagging of each packet corresponds to a forward error correction coding rate based on their corresponding level of importance.

According to some embodiments, the transmitter is further configured to: pack the packets into a plurality of Aggregated MAC Protocol Data Unit (A-MPDU) subframes; and transmit the A-MPDU subframes to the receiver.

According to some embodiments, the transmitter is further configured to: tag a plurality of Physical Layer Convergence Procedure (PLCP) Protocol Data Unit (PPDU) frames; pack the A-MPDU subframes having a same importance level into the PPDU frames; and transmit the PPDU frames to the receiver.

According to some example embodiments of the present invention, in a method for transmitting video for a display panel between a transmitter in electronic communication with a receiver over a wireless communication channel, the method includes: receiving, by a transmitter, a frame of video data from a data source; reorganizing, by the transmitter, the frame of video data into a plurality of packets according to levels of importance of bits of the frame of video data; generating, by the transmitter, a tag for each of the packets, the tags corresponding to different relatively levels of importance of the packets; and transmitting, by the transmitter, the packets and the tags to the receiver for display on the display panel such that each packet is transmitted according to different protection techniques based on their corresponding tagging.

According to some embodiments, the method further includes performing, by the transmitter, different protection techniques for each of the packets based on the tag corresponding to each of the packets.

According to some embodiments, the tag of each of the packets includes adding a bit pattern indicating a relative importance level of a packet to a header of the packet.

According to some embodiments, the method further includes packing, by the transmitter, the packets into a plurality of Aggregated MAC Protocol Data Unit (A-MPDU) subframes; and transmitting, by the transmitter, the A-MPDU subframes to the receiver.

According to some embodiments, the method further includes tagging, by the transmitter, a plurality of Physical Layer Convergence Procedure (PLCP) Protocol Data Unit (PPDU) frames with a same tag; packing, by the transmitter, the A-MPDU subframes having a same importance level into the PPDU frames; and transmitting, by the transmitter, the PPDU frames to the receiver.

According to some embodiments, the method further includes monitoring, by the transmitter, a return signal from the receiver; and adjusting, by the transmitter, the different protection techniques based on at least on a change in at least one of channel quality or video quality.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
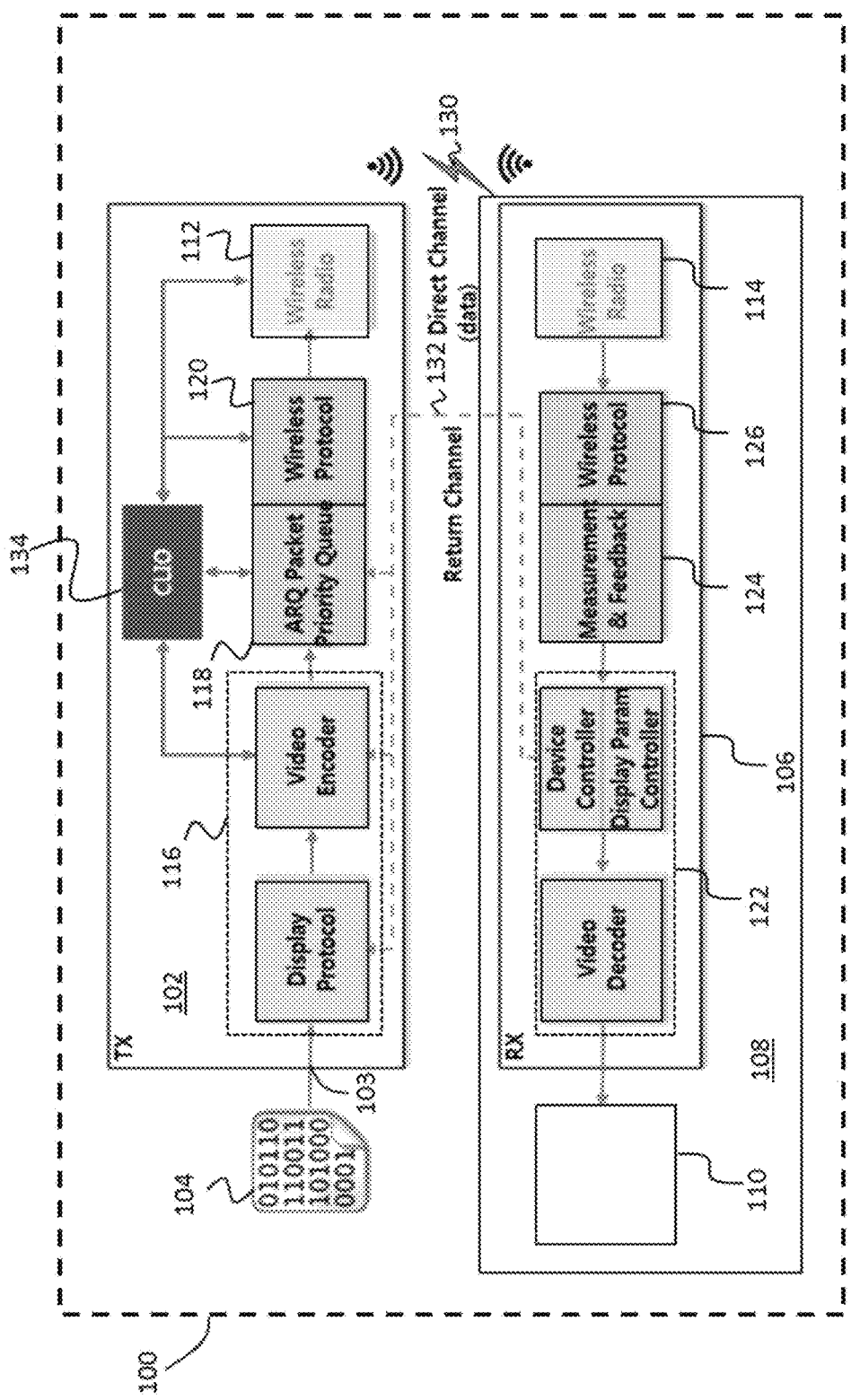
FIG. 1 is a block diagram illustrating a wireless data transmission system illustrating a high level overview description of a cross-layer optimization system, according to some example embodiments of the present invention.

Aspects of example embodiments of the present invention relate to a system and method for electronic data communication.

The detailed description set forth below in connection with the appended drawing is intended as a description of exemplary embodiments of a system and method for cross layer image optimization (CLIO) for wireless video transmission over multi-gigabit channels, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The future of display technology includes a world full of inexpensive displays fed by various wireless streaming devices (mobile phones, set-top boxes, projectors, etc.). High quality video transmission over wireless links has shown to be challenging. Wireless devices are non-stationary, while wireless links have scarce bandwidth and are susceptible to many types of noise. The latency may also be high and variable, which is particularly harmful to video. Due to the stringent requirements for video transmission, the common design methodology in which different layers (e.g., the Application (APP) layer, media access control (MAC) layer, and Physical (PHY) layer) are designed independently does not facilitate high data rate wireless data transmission. Accordingly, embodiments of the present invention provide a cross layer approach, in which the information at one layer is utilized to change parameters at different layers. Such flexibility allows for quick adaptation to the fast changes of the wireless link.

The IEEE 802.11ad standard is capable of providing the required bitrate for uncompressed full high definition (FHD) wireless video. 802.11ad works in the 60 GHz band using channels with 2.16 GHz of bandwidth and provides up to 4.6 Gbps of bandwidth at the physical layer (PHY) using a single carrier, which is sufficient for uncompressed FHD video transmission. IEEE 802.11ad, however, is only able to obtain the maximum bandwidth in certain deployments. For example, IEEE 802.11ad requires the transmitter and receiver to be located within short distance of each other and within line of sight (LoS)). Embodiments of the present invention, therefore, provide an improved approach for wireless data transmission.

According to several embodiments, various characteristics of the present invention may be used to improve and guarantee the QoS for video streaming over wireless networks, including Physical (PHY), medium access control (MAC), or Application (APP) cross layer solutions. Accordingly, information from one layer (for example, the MAC layer) may be used to optimize parameters in another layer (for example, the APP layer). For example, in video streaming, the APP layer could utilize information about channel quality in rate control (network awareness). Lower layers may also be configured to utilize information about video traffic characteristics. According to various embodiments, the system employs dynamic profile partitioning, dynamic tagging for packets, unequal error protection for different layers in layer based compression technique, and importance level aware modulation and modulation/coding selection, packetization, and bit or pixel pruning.

According to one embodiment, a cross layer method may be utilized to optimize perceptual quality in delay constrained scalable video transmission. Additionally, Unequal Error Protection (UEP) may be employed according to packet loss visibility in the PHY layer for each video layer. There is also buffer-aware source adaptation in the APP layer. A rate adaptation scheme is used for QoS-driven seamless handoff scheme based on the IEEE 802.11 Media Independent Handover (MIH) framework. In order to control the rate, the Quantization Parameter (QP) is adapted for the single layer coding (AVC/H.264) and the enhancement layers are dropped for the scalable coding (SVC/H.264). Rate and traffic adaptation along with admission control and automatic layer management to optimize QoS in terms of the number of admitted sessions and video quality in wireless video transmission is also included. Traffic management, path selection, and fame filtering are included as cross layer optimization techniques for video streaming over UDP/RTP in cellular networks. The cross layer framework includes video codec optimization, time slicing optimization for layer coded transmissions, and an adaptive Modulation and Coding Scheme (MCS) to optimize users' QoS levels and energy efficiency of wireless multimedia broadcast receivers considering display size and energy constraints.

By its nature, compression removes redundancy from a source and is thus inherently more sensitive to transmission errors. There are several methods that a compression system can use to mitigate the effect of transmission errors in a video stream. If the video stream has quality, spatial, or temporal scalability, then we can use the concept of unequal error protection (UEP) to provide higher levels of protection for the more important information bits. On the receiver side, if the video stream has the property of error resilience, then error propagation is minimized and a good proportion of errors can be ignored. After decoding, error concealment may be applied to the decoded output. One technique which uses temporal error concealment is to save the previous frame and replay the frame when the current frame is corrupted. Another possibility is to use the surrounding pixels of an area which is in error to predict the current pixels. Typically, error concealment is used as a last resort if the other methods fail.

FIG. 1 is a block diagram illustrating a wireless data transmission system 100, according to some example embodiments of the present invention. The wireless data transmission system 100 includes a transmitter 102, configured to receive, at an input terminal 103, data (e.g., uncompressed video data) from a data source 104 (e.g., an external data source such as a video card computer system). The wireless data transmission system 100 further includes a receiver 106. The receiver 106 may be incorporated into a user device or electronic device 108 (e.g., an electronic display device, smart phone, television, tablet, etc.) having a display panel 110 configured to display images and video. The display panel 110 includes a plurality of pixels, each of which may include a plurality of different color components (or sub-pixels) (e.g., each pixel may include a red component, a green component, and a blue component).

In the context of video, each frame of video is displayed (e.g., displayed briefly) as an image on the display panel 110. In some embodiments, the display panel 110 may, for example, be included as part of any electronic device 108 with an integrated display, such as a television, a monitor, a cellular phone, a tablet computer, a wearable device, augmented reality (AR) headset, or a virtual reality (VR) headset.

Additionally, the transmitter 102 is in wireless data communication with the receiver 106 by way of wireless radios 112 and 114 incorporated into the transmitter 102 and receiver 106, respectively. Thus, the transmitter 102 and the receiver 106 are configured to transmit data back and forth between each other using any suitable wireless data spectrum and standard (e.g., the Institute of Electrical and Electronics Engineers (IEEE) 802.11 standard). For example, the transmitter 102 is configured to transmit the data signal, along with parameters or characteristics of the cross-layer image optimization scheme, to the receiver 106 by way of a direct (e.g., data) channel 130 (e.g., a wireless communication channel), and the receiver 106 is configured to transmit feedback data or a return signal (e.g., including channel or visual quality data) to the transmitter 102 by way of a return channel 132.

Among other elements, the transmitter 102 further includes an application (APP) layer 116 (including, for example, display protocol and video encoder modules), a media access control (MAC) layer 118, and a physical (PHY) layer 120. According to embodiments of the present invention, various aspects of the cross-layer image optimization are performed or executed in the APP layer 116, the MAC layer 118 and the physical layer 120. Similarly, the receiver 106 includes an APP layer 122, a MAC layer 124, and a PHY layer 126.

The wireless data transmission system 100 may further include a cross-layer image optimization (CLIO) module or engine 134 operating as part of, or in coordination with the transmitter 102, for controlling the system and method for cross-layer image optimization. The CLIO module 134 may include, for example, a processor, and a memory coupled to the processor, with the memory storing instructions that, when executed by the processor cause the processor to execute various operations of the cross-layer image optimization system and method described herein. For example, the CLIO module 134 may be in electronic communication with the APP layer 116, the MAC layer 118, and the PHY layer 120 to exchange data and commands back and forth for implementing the cross-layer image optimization system and method described herein.

Thus, as illustrated in FIG. 1, the wireless data transmission system 100 is configured to receive data at a transmitter 102 and transmit data to the receiver 106, after implementing various mechanisms for cross-layer image optimization in the APP layer 116, the MAC layer 118, and the PHY layer 126.

A video compression/decompression system, or codec, can be evaluated in essentially six different ways: compression, quality (distortion), complexity, latency, quality scalability, and error resilience.

According to some example embodiments of the present invention, a layer-based compression architecture may be utilized for data or video compression, in which a video or data stream is parsed or divided into multiple quality layers, resolution layers, spatial positions, or color components. In related-art layer-based compression architectures (e.g., JPEG2000), a data stream begins with a frame header followed by a sequence of packet headers and data bits. However, the stream may not be sorted in order of importance, especially for real-time UHD codecs.

Figure 2:
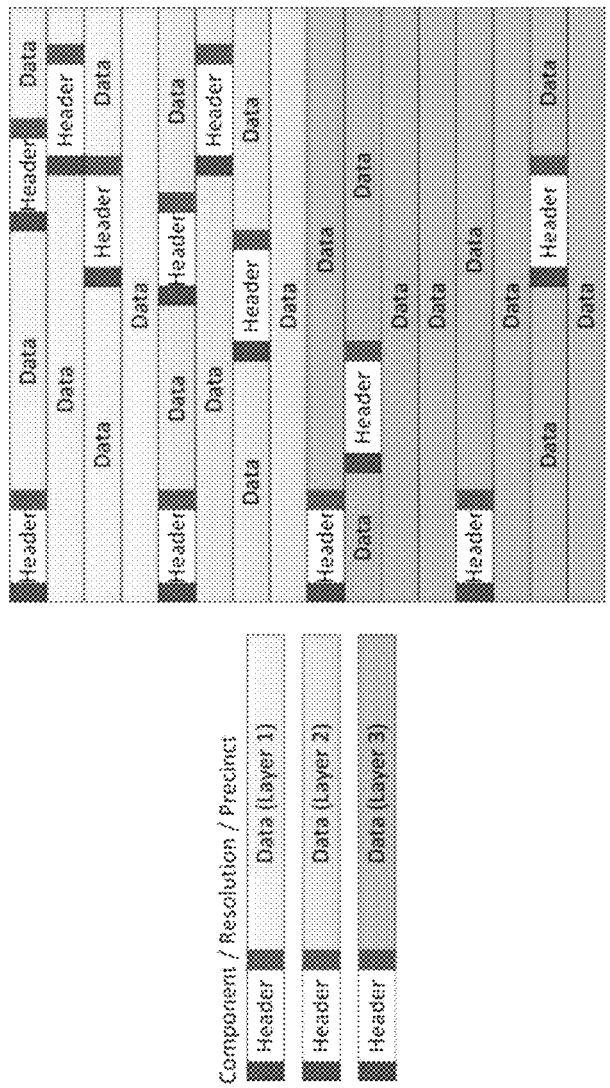
FIG. 2 illustrates an example layer-based compression scheme utilized according to some example embodiments of the present invention.

In one embodiment, a layer-based compression system (such as, or similar to the JPEG2000 standard) is utilized as a layer-based compression as part of the cross-layer image optimization system and method (e.g., executed by the CLIO module 134). A layer-based encoder according to embodiments of the present invention may employ the following steps: a color transform for the components, a wavelet transform on each color channel, quantization of wavelet coefficients, and finally arithmetic coding of rectangular areas of the wavelet coefficients known as code-blocks. Such an encoder provides flexibility for the structure of the encoded data, by allowing various sequences of these code-blocks based on color components, resolution levels, spatial block position, or layers. Individual code-blocks may be independently decodable, but the headers for these code-blocks may be dependent on previous headers and accordingly may be decoded in sequence, A layer-based compression encoded data stream utilized according to embodiments of the present invention may begin with a frame header followed by sequence of packet headers and data bits. As noted, the data stream can be divided in multiple quality layers, resolution levels, spatial position, and color components. However, depending on the specific encoding system utilized (e.g., JPEG2000) the stream may not be sorted in order of importance, especially for real-time UHD codecs. The example in FIG. 2 shows an example of a layer-based compression encoded data stream which was created in layers; for example the first layer could correspond to a compression level of 8:1; at the end of the second layer (having decoded all of the first layer packets) the compression is set at 4:1. Finally, decoding the third layer packets may be equivalent to sending stream at 2:1 compression. Embodiments of the present invention are not limited to the compression ratios or number of layers discussed above. Rather, embodiments of the present invention may utilize any suitable number of layers having any suitable compression ratio according to the design and function of the cross-layer image optimization system and method, such that the first or highest layer has the highest compression ratio, the next layer has data that, when added to the first layer, results in a compression ratio lower than that of the first layer, and so on, until the lowest or last layer has data that, when added to each of the preceding layers, results in a compression ratio that is relatively low, visually lossless, or near-visually lossless (e.g., 1:1, 1.5:1, 2:1) to viewers.

According to some embodiments, in the context of a VR display, when stereoscopic images are transmitted to the receiver, errors in data transmission may impact both the left and right image, even if the error is only on one side. Accordingly, in some embodiments of the present invention, the cross-layer image optimization system and method (e.g., the CLIO module 134 and/or the video encoder module of the APP layer 116) may perform compression on the left image plus the difference of the right image, and then ensure that the various left image plus the difference of the right image slices are encoded as a multiplexed stream. Such a procedure may reduce (e.g., by half) the number of instances where an error in data transmission impacts the visibility of the artifacts.

Embodiments of the present invention in cross layer algorithms for improving the quality of video streaming may further utilize one or more features of the PHY layer, for example, Dynamic Adaptive Modulation and Coding (AMC), in which the modulation and coding scheme (MCS) is changed based on an indicator of channel quality in the PHY layer. A lower MCS value provides a lower bit error rate but also achieves lower throughput. The MAC layer can inform the APP layer about the MCS to adjust compression rate based on the MCS.

Losing different bits and packets have different impact on video quality and embodiments of the present invention operate to protect more important bits in video reception utilizing UEP approaches, including more protection for most significant bits (MSB) in uncompressed/compressed video, more protection for packet headers in JPEG 2000, or more protection for the I-frame in MPEG-4. Protection can be achieved by using more robust MCS, retransmission, or additional error correction code like Reed-Solomon.

Figure 3:
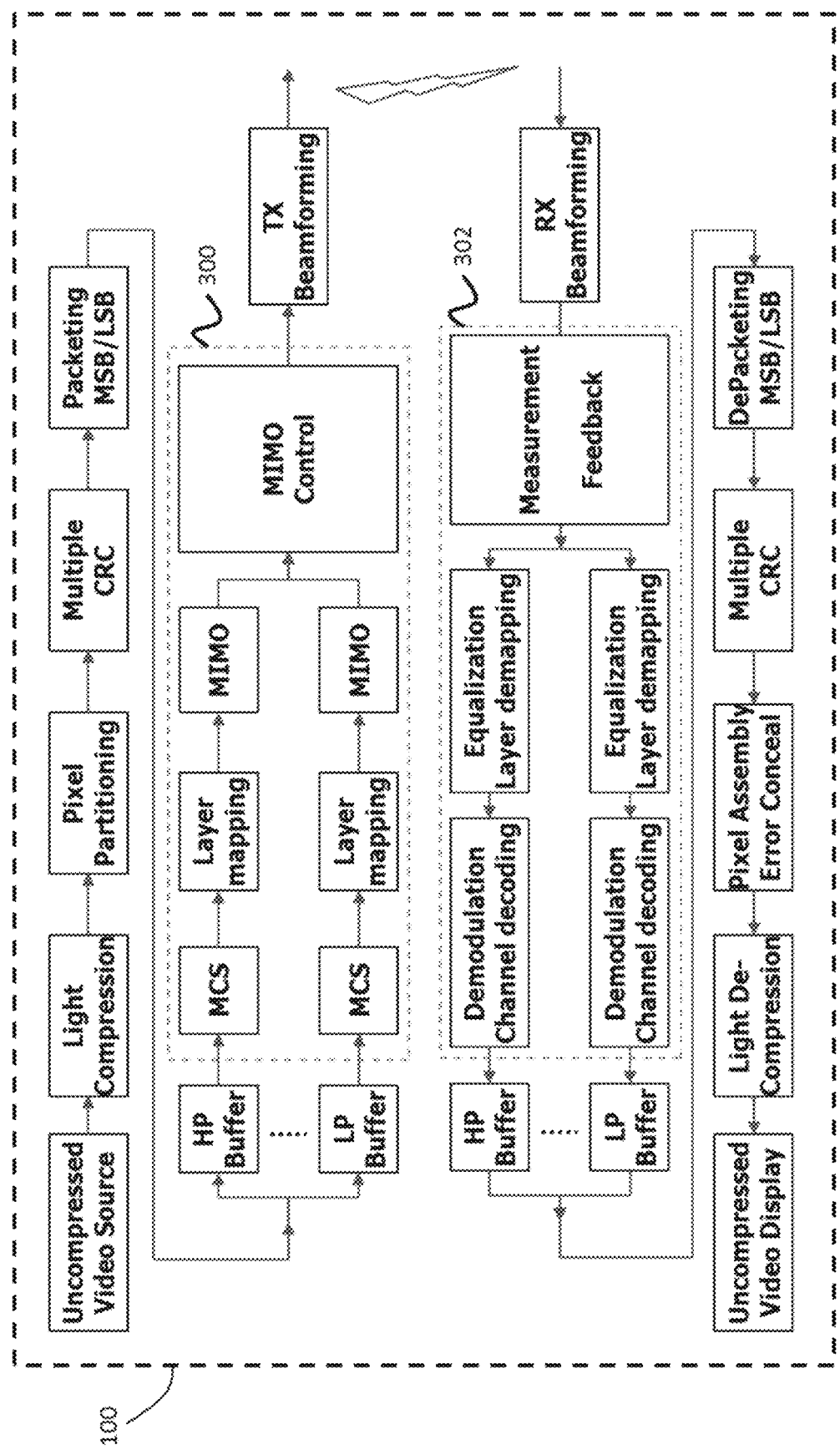
FIG. 3 is a block diagram illustrating further details of an example architecture and some components of a cross-layer optimization system, according to some example embodiments of the present invention.
Figure 4:
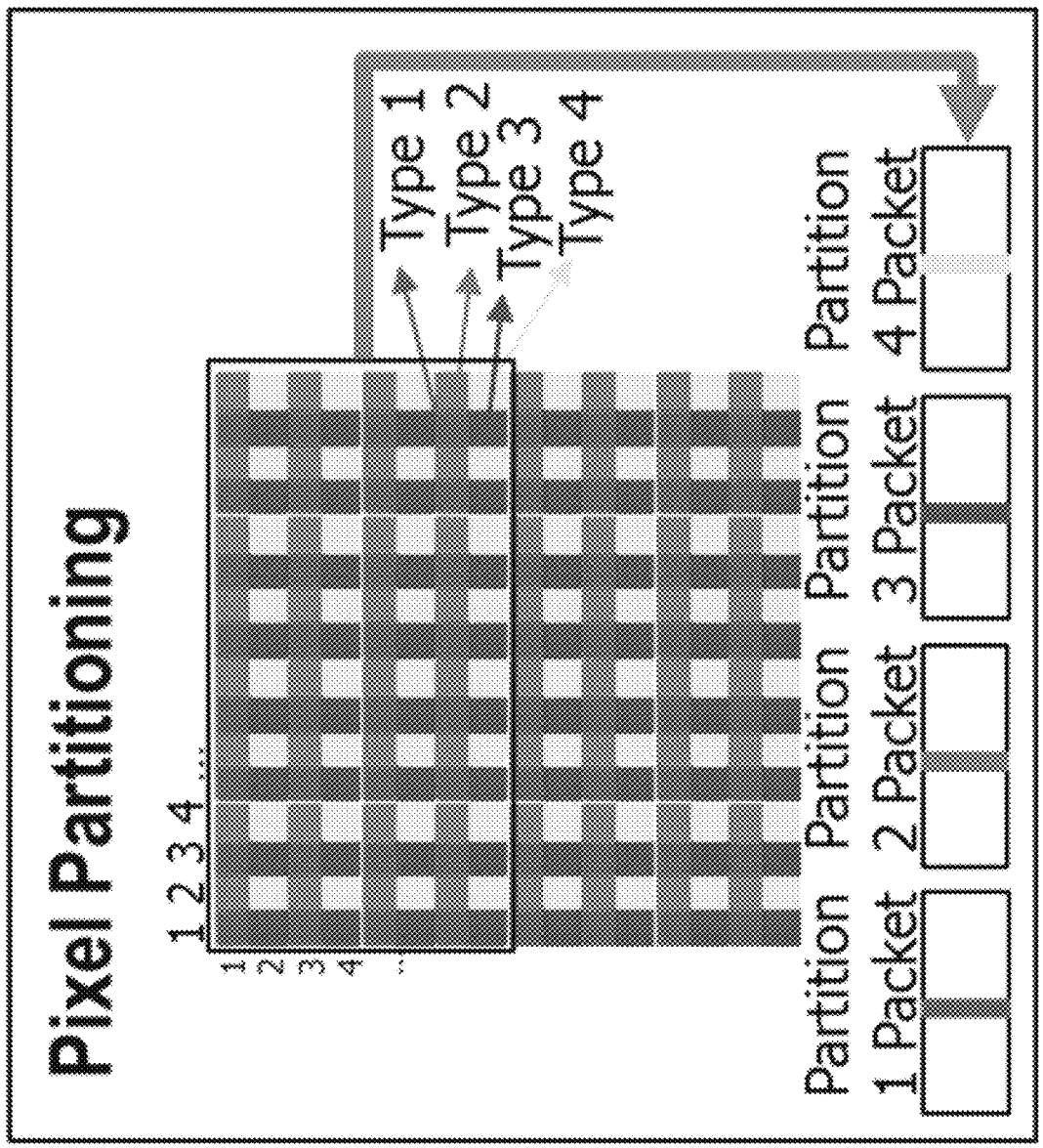
FIG. 4 illustrates an example partitioning of pixels into different types, according to some example embodiments of the present invention.

FIG. 3 is a block diagram illustrating further details of an example architecture and some components of a cross-layer optimization system 100, which includes control schemes at the APP, MAC and PHY layers, according to some example embodiments of the present invention. The measurement and feedback block is used to estimate conditions like the bit error rate, video quality, and the available bandwidth of certain service class. Then, the models in the APP layer and the MAC layer can minimize the distortion of the video quality by optimal bit allocation, reducing the number of bits required for forward error correction, and determining the priorities of packets according to the impact of their loss.

In some embodiments, as illustrated in FIG. 3, in the APP layer, the system may enable/disable light compression based on the feedback and measurement from the receiver (e.g., based on data received on the return channel 132 from the receiver 106). The feedback can be based on the video quality, for example, and the measurement of the video quality can be based, for example, on the signal-to-noise ratio (SNR) or peak signal-to-noise ratio (PSNR) reported by the receiver.

The MAC layer in FIG. 3 may include many functions, modules, or procedures including, for example, pixel partitioning, retransmission and multiple CRC checks, packetization with features like MSB/LSB separation and different buffers. Based on feedback received from the PHY layer or parameters in the APP layer, the system (e.g., the CLIO engine 134) can change parameters of these functions in the MAC layer and decide how these functions, modules, or procedures should work. For example, if pixel partitioning is performed or not and if pixel partitioning is performed, how the partitions are divided into packets. Also, they system may be configured to decide or select whether or not retransmission is enabled.

According to some embodiments, the system (e.g., the CLIO engine 134) may utilize these features in UEP implementation. For example, some of the packets may have these features like retransmission or these features can have different parameters for different packets like different MCS or MSB/LSB separation.

The PHY layer (e.g., PHY layer 302, with a corresponding PHY layer 304 in the receiver) can incorporate multiple layers for implementation of UEP as well, as illustrated in FIG. 3. Different packets may be sent through different layers with different MCS values. Different layers can be associated with different buffers with different priorities as well. According to some example embodiments, the system (e.g., the CLIO engine 134) may associate different packets according to the video quality and measurement feedback to different layers and buffers.

The first step in cross layer image optimization for uncompressed or compressed transmission, according to some example embodiments of the present invention, is layering or partitioning. Embodiments of the present invention utilize a plurality of predefined layering and/or partitioning profiles, described in further detail below. As part of a data transmission session, one of the different layering and/or partitioning profiles is selected based on one or more predefined parameters including, for example, the type of display device, different criteria or indicators for video visual quality (including peak signal-to-noise ratio (PSNR)), channel quality, codec requirements or selection, MCS and data rate requirements, and the like. Each profile indicates or is defined by a different set of procedures in the transmitter and receiver including, for example, a different error correction technique, compression, or packetization.

Additionally, embodiments of the present invention may utilize an unequal error protection (UEP) method as part of the cross-layer image optimization for ordered bit streams of different layers. Ordering of bit streams or packets may be performed on layered-based compressed video or uncompressed video. Different MCS values are utilized for different layers according to channel quality.

According to some example embodiments of the present invention, dynamic tagging for packets (e.g., in IEEE 802.11ad) may be utilized as part of the cross-layer image optimization system and method of the present invention. Importance levels and corresponding information may be transmitted or signaled to the receiver, as importance level aware procedures are implemented in MAC packetizer for the transmitter and depacketizer at the receiver.

As described above, embodiments of the present invention, the system may utilize dynamic layering and partitioning profiles as part of the cross-layer image optimization system and method of the present invention. The transmitter and receiver (e.g., the transmitter 102 and the receiver 108) may both utilize or agree on a plurality of predefined layering/partitioning profiles. These profiles can be selected based on different criteria for video visual quality (including PSNR), channel quality, codec requirements or selection, MCS, data rate requirements, etc. The receiver then selects the corresponding algorithm(s) to be run to reverse the layering method and/or further correct any transmission errors using an error concealment algorithm corresponding to the selected profile.

In one embodiment, the system utilizes 7 profiles for use with various channel conditions, although the number of profiles is not limited thereto, and any suitable number of profiles may be utilized according to the design and function of the wireless data transmission system.

For example, a profile "00" may be defined for when the channel is operating in ideal or near ideal conditions, while a profile "06" may be defined for when the channel is operating in very poor conditions. The profiles between "00" and "06" are then defined for various intermediary conditions.

Figure 5:
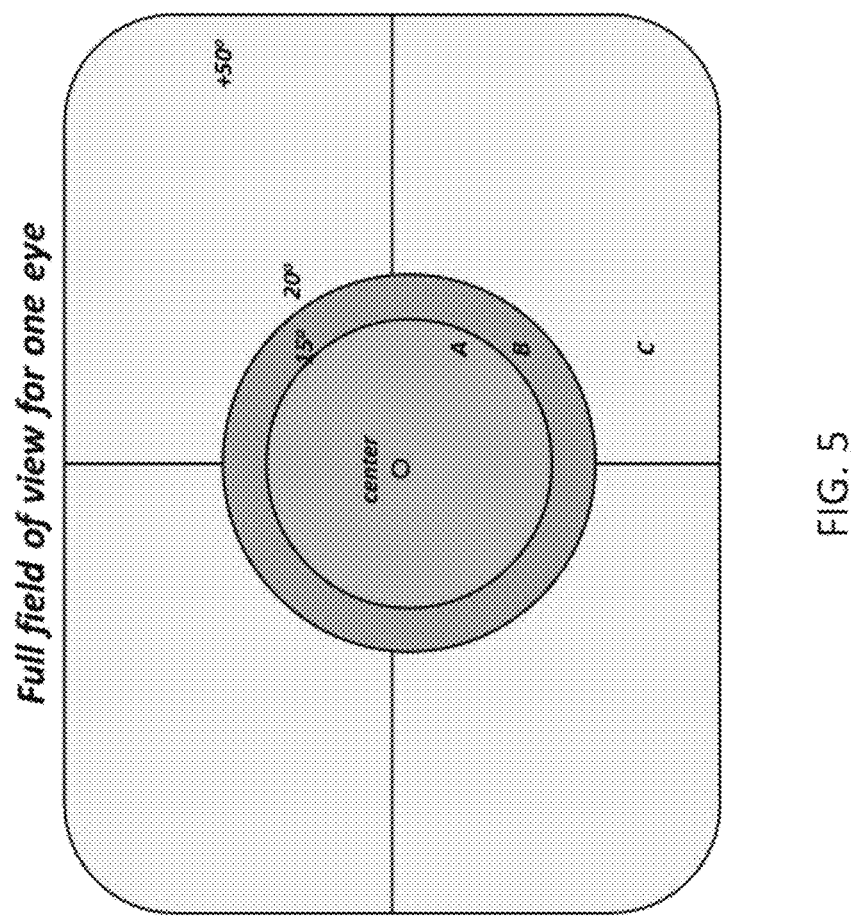
FIG. 5 illustrates an example of a field of view for one eye, according to some example embodiments of the present invention.

For example, one profile (e.g., profile "00" or the ideal/near-ideal condition profile) can be defined for uncompressed video transmission for when the channel quality is high. For such a profile, the pixel partitioning technique may assume that pixels beside each other have a high probability of containing very similar content. If any pixel from a group of 4 is missed, it might be recalculated from other 3 captured pixels. Profile "00" can be selected by dividing an image to 4 types of pixels, as illustrated in FIG. 5. Three colors of pixels in one type are packed in 1 packet. All the four type packets are transmitted to the receiver. The receiver, knowing the Profile "00" is being transmitted, can improve the image quality. For example, if pixel data of any of the pixels (or any color in the pixel) is missing, the receiver runs an averaging method to replace the missing pixel or color by averaging a group of 4 or 8 surrounding pixels (number of averaging pixel can be dynamic). Image compression methods also rely on the idea that pixels beside each will have correlated values. This method may be simpler to implement and more robust to bit errors compared to an entropy-coded compression algorithm.

A second profile (e.g., profile "01") can be selected by dividing an image to 4 types of pixels, similar to the first profile (Profile "00"). However, three types of pixels are chosen for transmission. The system calculates if the resulted distortion by dropping one type of pixel is lower than a threshold value. If this profile is signaled to the receiver, the receiver will estimate the missing pixel data values from average of three (or more) other pixels within each of the four pixel types. The thresholds can be selected based on different criteria including, for example, visual quality (e.g., PSNR). The choice of pixel type which was not transmitted and threshold can also be signaled.

A third profile (e.g., Profile "02") may operate on (e.g., be selected due to) a lower bandwidth than the first two profiles described above (e.g., Profiles "00" and "01"). For example, the third profile may not transmit the least significant bit (LSB) of pixels in one or all of the packets. Then, in the receiver, an averaging algorithm may compensate for those bits. Another threshold level for distortion can be considered to select the third profile (e.g., Profile "02") instead of the first or second profiles described above (e.g., Profile "01" or "00") for uncompressed video.

Other profiles can be considered for compressed video when the quality of channel is lower and PHY layer signals a lower value for MCS. For example, multiple quality-layering may be used in order to define new profiles for wireless video transmission. In a layered-based compression, multiple layers can be generated, as described above. According to embodiments of the present invention, the highest layer may include the data with the highest compression ratio from among the plurality of layers, and the lowest layer may include data which, if added to the higher layers, would form an image with a relatively low (e.g., 1:1 or 1:1.5, or any suitable or visually lossless compression ratio) compression ratio. For example, in a three layer compression scheme (e.g., as illustrated in FIG. 2), Layer 1 may include the compressed image data with a compression ratio of 4:1. Layer 2 may include the data which if added to Layer 1 would form the compressed image with a compression ratio of 2:1. Layer 3 may include the bit stream that if added to layer 1 and 2, the resulting image has the compression ratio of 1:1 (or 1.5:1 or any other visually lossless compression ratio).

The transmitter selects which layers to send according to channel quality, visual quality, codec requirements, etc. We can define a fourth profile (e.g., Profile "03") as sending Layers 1, 2, and 3 (or all of the layers), a fifth profile (e.g., Profile "04") as sending Layers 1 and 2 (or a sub-set of the layers), and a sixth profile (e.g., Profile "05") as sending only Layer 1 or the layer with the highest compression ratio. For a seventh profile (e.g., profile "07") the transmitter may send a portion of one of the layers, for example, all of Layers 1 and 2 and only a portion of Layer 3. The receiver, by knowing the seventh profile (e.g., Profile "06") is transmitted, will look for missing data information or run additional correcting algorithms. The transmitter can indicate the length of original packet and also transmitted packet length in the packet header. The receiver therefore knows that part of the layer is not received and can infer the correct size of received packet. Also, the receiver warns the decoder that part of a packet is not received and it may request that extra information be resent or retransmitted by the transmitter.

Additional profiles may be established according to the type of data being transmitted, the nature of the display on which images will be displayed, or the importance of particular portions of an image relative to other portions of the same image. For example, according to some embodiments, certain portions or regions of the image may be more important than other portions of the image in the sense that errors in data transmission for bits corresponding to one portion of the image may be more perceptible to the viewer than errors in data transmission for bits corresponding to another portion of the image.

According to some embodiments, the cross-layer image optimization system and method may be deployed in the context of a VR display system, for example, in which the display (e.g., the display 110) is a VR display. In such situations, a vast majority (e.g., 90 percent) of the viewer's perception of the image is focused on and around the center of the image (e.g., the center 15 degrees of view), because users tend to move their head to focus on different portions of an image. Thus, as illustrated in FIG. 5, the cross-layer image optimization system and method (e.g., the CLIO module 134) may prioritize the data corresponding to a first or central region of an image (e.g., the region labeled in FIG. 5 with the label "A," for example, 15 degrees of view) above a second region of the image (e.g., the region labeled in FIG. 5 with the label "B," for example, between the first region and a second field of view outside the first region, or between 15 and 20 degrees of view). Further, the first and second regions of the image may both be prioritized above a third region of the image (e.g., the region labeled "C" in FIG. 5, for example, outside the first and second regions or outside 20 degrees of view).

Another method of identifying regions of an image having higher importance or priority is described in U.S. patent application Ser. No. 15/288,977, which is incorporated herein by reference in its entirety. For example, according to some embodiments, data corresponding to regions of an image having higher importance may be designated with a higher level of importance or higher degree of error protection compared to data corresponding to regions of an image having lower importance. The regions of an image that have higher importance may vary according to the type of display device corresponding to the receiver, for example, as discussed herein with respect to FIG. 5.

Because the different regions of the image may be prioritized differently, the cross-layer image optimization system and method (e.g., the CLIO module 134) may select a profile (e.g., a layering/partitioning profile, as discussed above) or a UEP scheme (described in more detail below), such that the data in the first region has the lowest level of errors compared to data in the other regions of the image, the second region of the image has the second lowest level of errors, and so on. Furthermore, according to some embodiments, the cross-layer image optimization system and method (e.g., the CLIO module 134) may partition the data such that errors from the outer region or regions do not propagate to the highest priority (e.g., the center) regions of the image.

According to some example embodiments, the cross-layer image optimization system may utilize, for example, the various profiles discussed above (for example, the first through seventh profiles) for prioritizing different portions of the image for transmission, such that a lower number profile (e.g., a lower error-prone profile) is selected for the higher priority portions of the image, and a higher number profile (e.g., a higher error-prone profile) is selected for the lower priority portions of the image. According to some embodiments, a separate profile may be predefined specifically according to the type of display device (e.g., television, VR display, AR display, wireless medical display, and the like), such that data is transmitted with different procedures in transmission (e.g., compression, encoding, packetization, bit dropping, or pruning) or reception (e.g., decompression, decoding, error correction, de-packetization, retransmission) according to the priority level of the portion of the image data being exchanged.

In one embodiment, the selection criteria for layering or partitioning profiles can be based on video visual quality (e.g. PSNR) and/or channel quality (e.g. SNR). Layering identifies if uncompressed video, uncompressed video with some packets being dropped, or compressed video with different compression ratios should be sent. Different layers may be treated differently in terms of queue priority, delay tolerance, error protection, and/or reliability. Correspondingly, the transmitter and receiver, by selecting a profile or receiving a profile number, may enable different procedures prior to or as part of data transmission (e.g., compression, encoding, packetization, bit dropping or pruning) or reception (e.g., decompression, decoding, error correction, depacketization).

According to some embodiments, the choice of the profile can be transmitted to the receiver by a bit selection in a MAC or PHY header packet. Based on the bit selection, the receiver may identify the selected method for layering. In addition to the profile number, any other information required for the selected profile might be transmitted to the receiver including, for example, the number of layers in compression, and/or number of packets/bytes in each layer. The extra information can be sent by bit patterns in the packet header or through a secure channel or can be predefined.

Thus, one or more example embodiments of the present invention include a system and method for selecting a set of predefined layering and/or partitioning profiles for transmitting data (e.g., uncompressed video data) from a transmitter to a receiver over a wireless data communication channel. Profiles may be selected according to various conditions or parameters including, for example, channel quality, video quality, codec requirements or selection, MCS and data rate requirements, the nature or characteristics of the data being transmitted, the nature or characteristics of a display device at the receiver end (e.g., coupled to the receiver), and the like. The selection of the profile may be transmitted to the receiver from the transmitter by a bit selection in the MAC layer and/or PHY layer header packet, for example. Depending on the selected profile, additional information may also be transmitted (e.g., in the MAC layer and/or PHY layer header packet) from the transmitter to the receiver indicating one or more parameters for decompression, decoding, error correction, and the like. Based on information transmitted from the transmitter to the receiver (e.g., the bit selection) the receiver may be enabled to identify the method and/or protocol utilized at the transmitter for data layering and/or partitioning and/or compression, and thereby select a corresponding algorithm or procedure to execute to reverse the layering and/or partitioning and/or compression, and also to correct any errors during transmission with error concealment algorithms or procedures corresponding to the selected profile.

Figure 6:
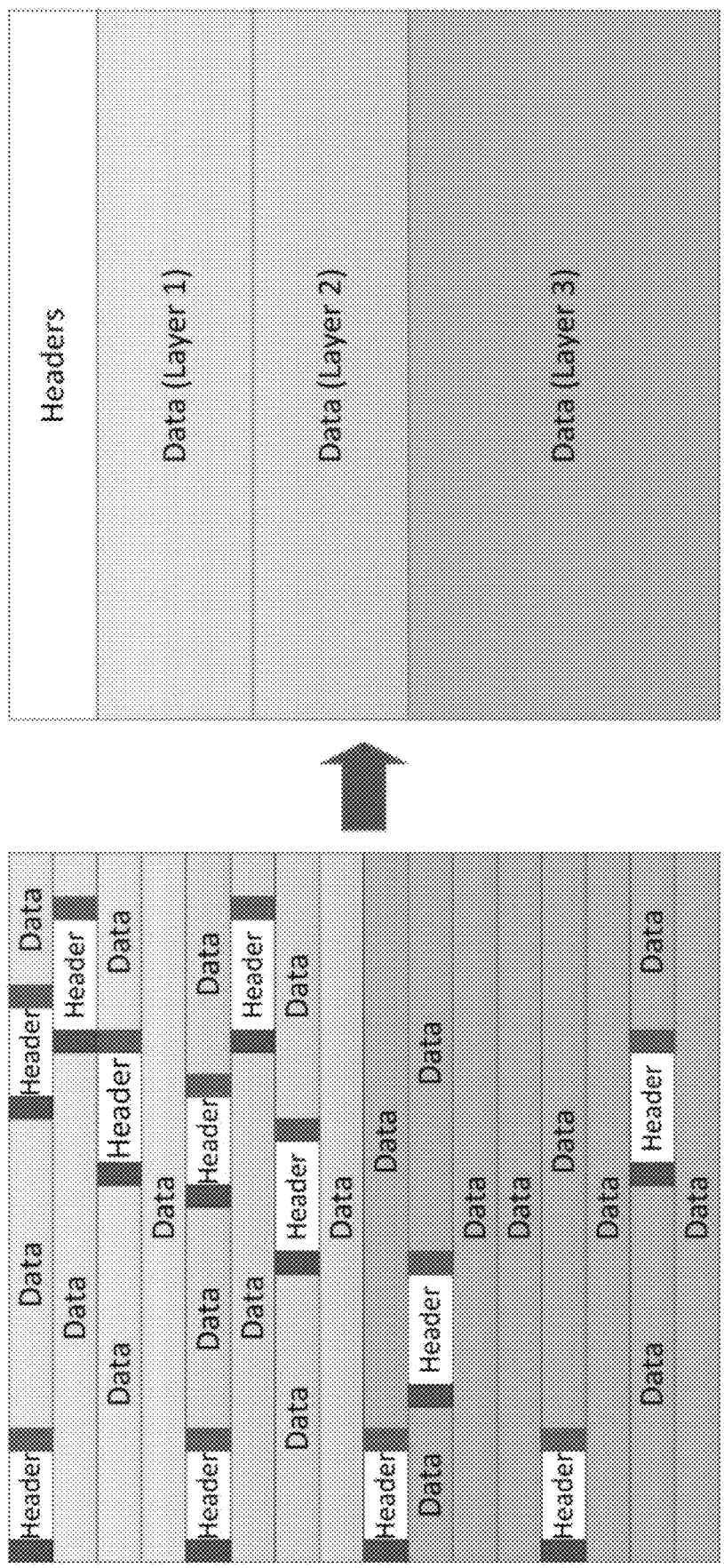
FIG. 6 illustrates an example of a reorganization of a packet or layer structure, according to some example embodiments of the present invention.
Figures 7, 8:
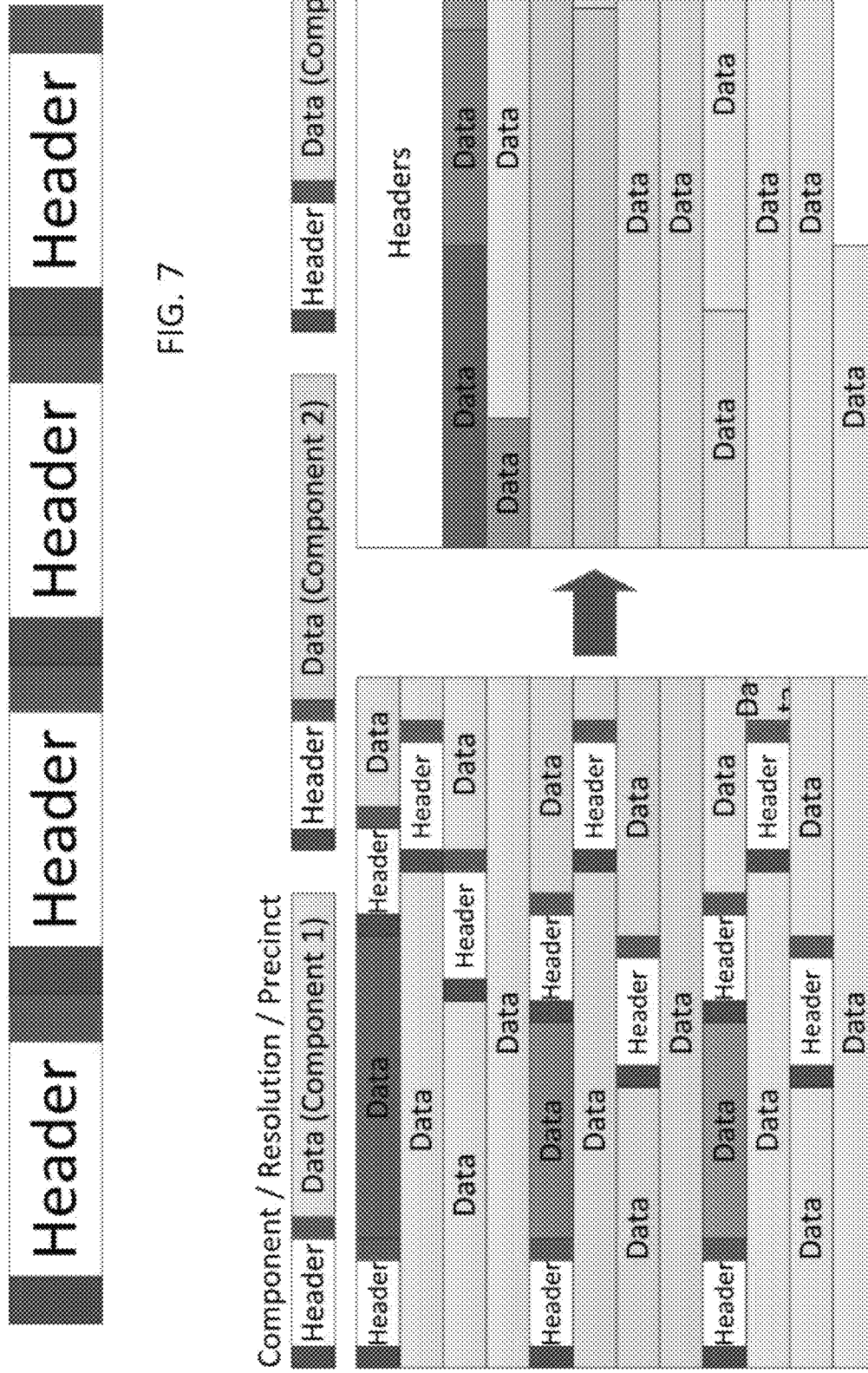
FIG. 7 illustrates an example header structure according to some example embodiments of the present invention.
FIG. 8 illustrates an example reorganization of data, according to some example embodiments of the present invention.

Embodiments of the present invention may further utilize priority-based unequal error protection (UEP) to protect (e.g., facilitate proper transmission of) bits that are more important, for example, for the purposes of video decoding. For example, in layer-based compression, bits associated with or corresponding to a higher compression rate (e.g., corresponding to the base layer, or Layer 1) are more important in video decoding and therefore require more protection. In addition, bit errors in the packet headers or frame headers render the video decoder unable to decode subsequent data bits. In one embodiment of the cross-layer image optimization system method, packet headers are moved to the beginning of each frame, as illustrated in FIG. 6. Additionally, packet headers may be identified by unique begin and end values, as illustrated in FIG. 7. When headers are moved to the beginning of the frame, the identifiers are also moved to separate the headers from each other. The end identifier may also be removed, according to some example embodiments. The last end identifier can be kept to distinguish between end of header information and data information in the next layer.

According to some example embodiments, the cross-layer image optimization system and method (e.g., the CLIO module 134) may utilize different protection techniques against loss or error in the wireless medium for those headers and the base layers. For example, according to some embodiments, different MCS values may be utilized for different layers or different forward error correction (FEC) algorithms may be utilized with different coding rates. Additionally, the unequal error protection operations may be executed at the MAC layer, thereby enabling embodiments of the present invention to improve or optimize the reorganization engine and apply it to different codecs as well. For example, while the APP layer delivers the whole data to the MAC layer, the MAC layer has more flexibility to perform various cross-layer image optimization operations described herein. Additionally, by executing the UEP in the MAC layer, the system is relatively more dynamic, because different functions can be modified with different parameters according to the particular situation, as described herein. Further, embodiments of the present invention may therefore be enabled to perform only partial reorganization based on the status of the wireless channel.

Compression techniques utilized according to embodiments of the present invention may provide additional partitioning techniques aside from layers of different compression ratios by providing different data components as illustrated in FIG. 8. For example, various similar pixel bits (e.g., pixel bits with the same or similar MCS values) may be reorganized in a packet to be grouped together. Any suitable compression technique which can also partition its output into multiple layers with different priority can be used. The same approach in moving headers and data can be used. Different MCS values or FEC with different coding rates can be used for header or partitions of data.

In one embodiment, the header includes the information on the length of the data packet coming after that header in a frame. In some instances, the cross-layer image optimization system and method may transmit a portion of the data bits in each layer or partition according to channel condition, MCS conditions, bandwidth conditions, etc. Therefore, the length of data stream may also be transmitted may be appended to the header information and transmitted to the receiver. For example, a fixed or predetermined number of bytes (N bytes) may be reserved to identify this length. According to some example embodiments, the length of the data stream can be at the end of each header for easy identification.

Thus, a system and method according to some example embodiments of the present invention may be configured to repartition or reorganize bits in a layer or level based compression system according to priority, delay tolerance, and/or protection or reliability levels for transmission over the wireless data communication channel. A frame of data includes a frame header and packet header bits, which require a higher level of protection compared to the data bits. Data bits in the frame may also be partitioned into different priority, protection, and/or reliability levels. Headers may be identified according to a predefined or known bit string, and data bits may be sorted according to an order of importance. According to some embodiments, higher priority or less delay tolerant bits may be moved or reorganized to the beginning of a frame of data. For example, a frame of data may begin with the frame header, followed by packet headers, followed by data bits (e.g., in order of priority or importance). Packet headers maybe separated or identified by predefined or predetermined bit strings. Additionally, according to some embodiments, the length of data bit streams may be indicated by inserting an indicator of the length corresponding to each packet header into, before, or after the packet header. A decoder at the receiver reconstructs the frame, for example, by moving packet headers and other data bits to their original locations (prior to reorganization), and removing any additionally inserted data, such as the data length bits, but uses the additional data to reconstruct the frame.

Accordingly, embodiments of the present invention may provide implementation of unequal error protection for any layer and/or level based compression technique for cross layer image optimization. Headers, layers, and/or data partitions may be reorganized according to importance or priority level, and such reorganization may be executed in the MAC layer of the transmitter. According to the cross-layer image optimization scheme, some portion of the data from each packet may be removed or dropped, and information about this data may be incorporated into the header information. Additionally, embodiments of the present invention may utilize unequal error protection, for example, by utilizing different MCS values for forward error correction to protect information with different levels of importance or differently. As part of the unequal error protection according to some example embodiments of the present invention, because all headers may be reorganized to be grouped together (e.g., at one location) all of the headers may undergo one unequal error protection algorithm, rather than, for example, utilizing multiple small forward error corrections for each of the headers in a frame individually.

According to some example embodiments of the present invention, because different packets may be protected differently using UEP and layer/partition-based compression, losing different packets affect the visual quality differently. If certain packets in the base layer or headers are lost, for example, the system may not be able to reconstruct the video at the receiver side. On the other hand, some packet loss may result in PSNR degradation. Additionally, as discussed above, depending on the type of display device being utilized in the system, different portions of image data may have a higher priority in terms of minimizing errors than other portions of the image data. Therefore, embodiments of the present invention may further utilize dynamic UEP and importance aware tagging, as described in more detail below.

As discussed above, the cross-layer image optimization system and method according to embodiments of the present invention operate to partition the packets into different levels of importance based on priority, delay tolerance, protection, or reliability. Each level of importance can be treated differently in transmission and/or reception.

In one embodiment, each frame is divided into multiple video packets with different levels of importance. The system then tags each packet with the corresponding importance level and corresponding bits are packed in Aggregated MAC Protocol Data Unit (A-MPDU) subframes and Physical Layer Convergence Procedure (PLCP) Protocol Data Unit (PPDU) frames. In one example, PPDUs can be tagged with the importance level and dynamically packed with packets and A-MPDU subframes of the same importance level. If retransmission is enabled, the A-MPDU subframes that need to be retransmitted are required to be queued and placed in the proper PPDU with proper importance level.

According to another embodiment, each A-MPDU subframe may be tagged according to importance level. In this case all PPDUs are considered equally in terms of importance level and they are packed with A-MPDUs with different importance levels. In delay sensitive scenarios which require retransmission, it may be advantageous to tag A-MPDU subframes rather than PPDU packets. Although tagging A-MPDU subframes rather than PPDU packets may utilize more overhead for tag information, such an approach may be easier for managing packets of multiple importance level.

According to various embodiments, a bit-pattern can be added to the header of A-MPDU or PPDU in order to tag the packets. The bit pattern can be M bits, with 0 . . . 0 representing the highest importance and 1 . . . 1 representing the lowest importance. According to some embodiments, the value M may be pre-defined or the M value may be signaled as part of the header information. According to some embodiments, the transmitter and receiver may define 2^M importance levels and different procedures for each level.

For a guaranteed quality of service for wireless video transmission over IEEE802.11ad or IEEE 802.11ay, the cross-layer image optimization system and method according to some example embodiments of the present invention may implement UEP through dynamic Importance Level Aware AMC for each tagged importance level. Different importance levels can be modulated with different MCS values or they can be encoded with different forward error correction (FEC) values or with the same FEC values but with different coding rates.

Figures 9, 10:
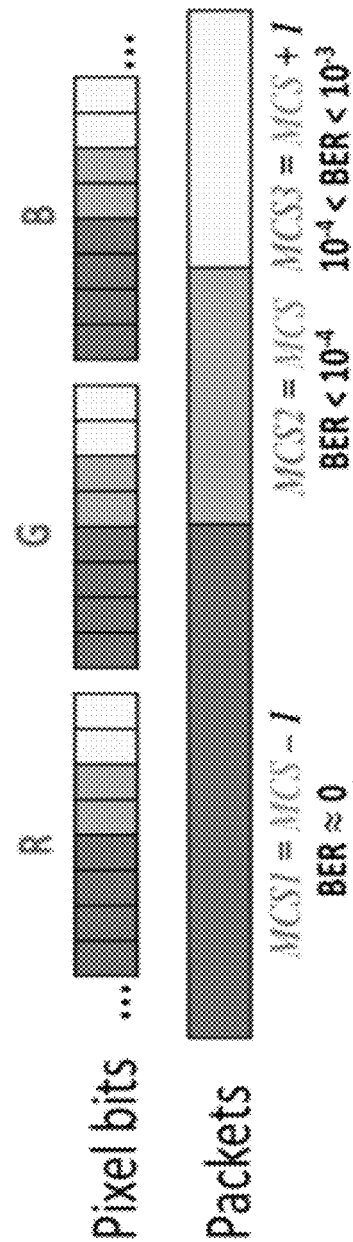
FIG. 9 illustrates an example reorganization of pixel bits and packets, according to some example embodiments of the present invention.
FIG. 10 illustrates available header fields under a wireless communication standard.

In related art systems, the PHY may recommend the MCS index appropriate for the current channel situation. According to some embodiments of the present invention, however, the cross-layer image optimization system and method may adapt the recommended MCS for a majority of the bit stream. For example, the system may decrement the MCS index for more important layers or packets, and increment the MCS index for less important layers or packets. FIG. 9 illustrates an example for uncompressed video transmission in which the system selects different MCS values for MSB/LSB parts of bits representing RGB colors in pixels. The four MSB bits are sent with MCS−1, the next 2 bits are sent with MCS, and the last 2 LSB bits are sent with MCS+1. It also includes regrouping of the bits into packets/A-MPDU subframes such that bits with the same MCS index are grouped into the same packets/A-MPDU subframes.

For example, for compressed video transmission, after layered-based compression is performed and the bits are reorganized according to the importance level of transmission, as discussed above with respect to FIG. 6 and FIG. 8, the headers and base Layer 1 are transmitted with MCS−1, Layer 2 is sent with MCS, and finally Layer 3 can be sent with MCS or MCS+1. The headers and layer 1 are therefore protected more and are transmitted almost error free. Because these information bits are sent with MCS−1, it is probable that the required bandwidth exceeds the supported bandwidth of the channel with MCS. To compensate, portions of Layer 3 can be dropped and/or Layer 3 bits can be modulated with MCS+1

In IEEE 802.11ad, the MCS index is only signaled for each PPDU packet of 262,143 bytes. Therefore, if PPDUs are tagged with importance levels, embodiments of the present invention may utilize the IEEE 802.11ad procedure for using the recommended MCS or modified MCS index for each packet. According to some embodiments, the signaling in IEEE 802.11ad may be modified such that MCS is signaled for each A-MPDU subframe. For example, the current reserved bits or unused information in the headers of each packet may be utilized. According to IEEE 802.11ad specification, the header includes the fields in FIG. 10. As an example, in peer to peer connections, embodiments of the present invention use "Address 4" for signaling MCS. Embodiments of the present invention may additionally add new bytes to the header to signal the MCS for each A-MPDU.

Thus, a cross-layer image optimization system and method according to some example embodiments of the present invention may operate to partition data (e.g., pixel data, packets, etc.) of a video frame into different categories of importance based on, for example, priority, delay tolerance, and/or protection or reliability. Each video frame may be divided into multiple levels of importance and corresponding bits may be packed into A-MPDU subframes. Different packets (e.g., A-MPDU subframes, PPDU subframes, etc.) may be tagged according to importance level, and according to some embodiments, the different packets may be transmitted to the receiver according to their order of importance. Different packets (e.g., A-MPDU subframes) may be grouped (e.g., into PPDU packets) according to their importance level. A value or tag indicating the importance level may be added to the header of the packets. At the receiver end, the receiver may be enabled to determine the tag level and thereby further enable different error recover and/or concealment procedures according to the tagging. Additionally, data having different levels of importance may be protected differently by selecting different modulation and coding scheme (MCS) values for each packet. The corresponding MCS values may be inserted into the header for the packet in addition to the tag.

Accordingly, embodiments of the present invention may enable dynamic partitioning and/or tagging for packets (e.g., in IEEE Multi-Gigabit 802.11) and importance aware procedures in the transmitter and receiver for wireless data transmission, including AMC for wireless cross-layer image optimization. Embodiments of the present invention may enable tagging of each small packet within the A-MPDU (data) packets, with multiple content driven tags. The tags may be transmitted and signaled to the receiver. Different procedures or parameters may be associated with the tags for incorporating various aspects of the cross-layer image optimization mechanisms discussed herein. Additionally, embodiments of the present invention may utilize unequal error protection based tags, such as AMC (MCS adaptation for tags).

According to various embodiments of the present invention, the system may continuously monitor the various parameters and factors for cross-layer image optimization, and adjust accordingly. For example, the system may monitor the return signal from the receiver and as circumstances change, adjust the cross-layer image optimization accordingly, for example, by selecting different profiles, compression or error correction techniques, and the like, as discussed above, for subsequent data transmission.

Figure 11:
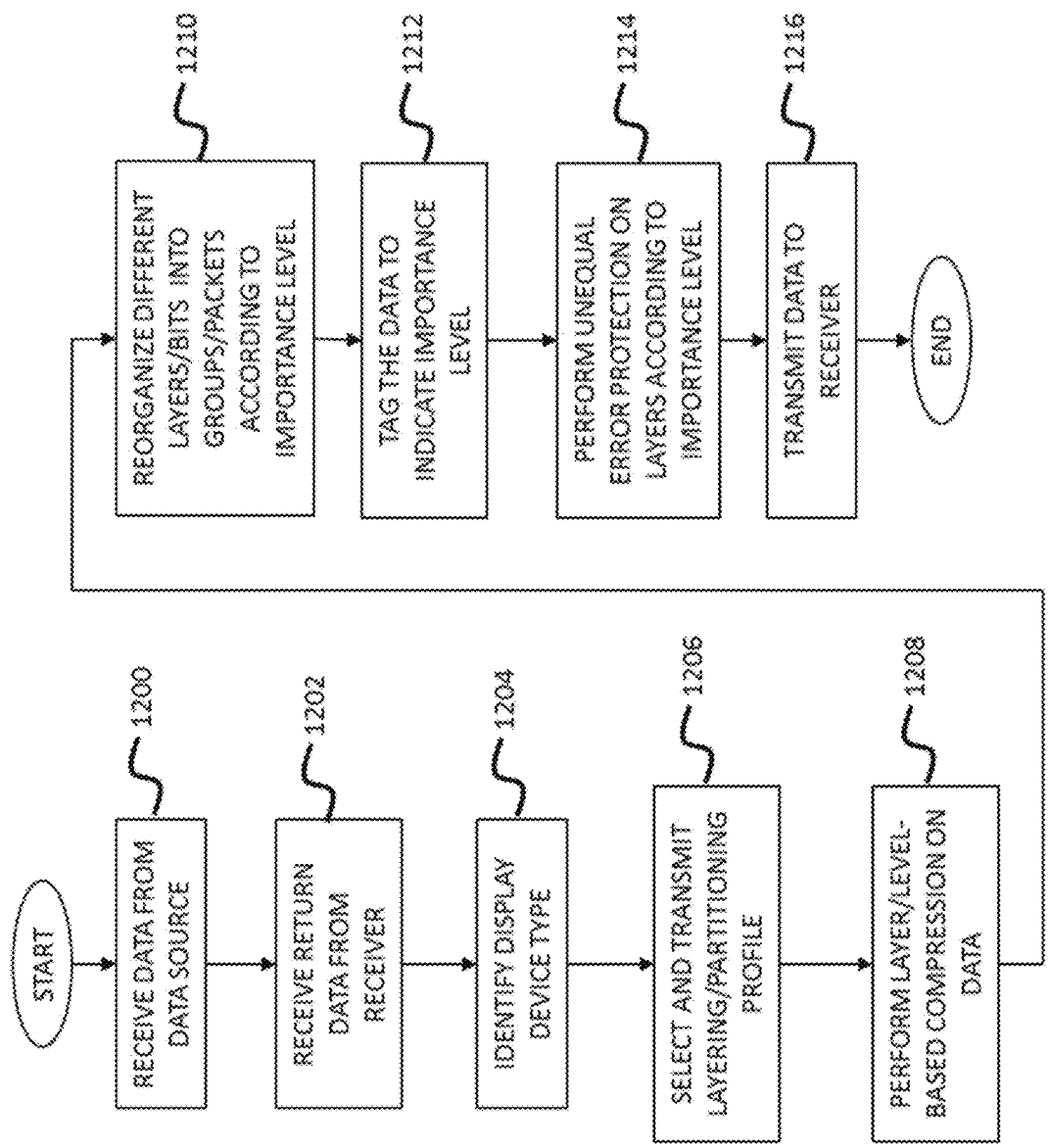
FIG. 11 is a flow chart illustrating a process for cross-layer image optimization, according to some example embodiments of the present invention.

FIG. 11 is an example flow diagram illustrating various operations in a method for cross-layer image optimization, according to some example embodiments of the present invention. The number and order of the operations illustrated in FIG. 11, however, is not limited to the flow diagram illustrated. For example, according to some embodiments, the order of the operations may be modified (unless otherwise indicated) or the process may include additional operations or fewer operations all without departing from the spirit and scope of the present invention. For example, the various other features and operations described in the present disclosure and the corresponding figures may be incorporated into the process, or certain operations may be omitted according to some example embodiments of the present invention.

The process starts and, at 1200, the system (e.g., the wireless data transmission system 100 and/or the transmitter 102) receives data (e.g., a video data signal including, for example, uncompressed video data) from a data source. At 1202, return data is received from a receiver (e.g., receiver 106), which includes various information about the data transmission to the receiver including, for example, channel quality, visual quality, and the type of display device connected to the receiver. Thus, at 1204, the system may identify the type of display device. At 1206, a layering/partitioning profile is selected based on one or more pre-defined parameters including, for example, the type of display device, different criteria or indicators for video visual quality (including peak signal-to-noise ratio (PSNR)), channel quality, codec requirements or selection, MCS and data rate requirements, and the like.

At 1208, layer or level-based compression may be performed on the data, for example, according to the selected layering/partitioning profile. Then, at 1210, the layers, partitions, packets, or bits of data are reorganized into groups or packets according to their importance level, as discussed above.

At 1212, the data may be tagged to indicate the importance level of the data and/or the packets of data. Then, based on the importance level of different types of data, unequal error protection may be performed for transmitting the data to the receiver. At 1216, the data is transmitted to the receiver, for example, for display on a display panel.

A wireless data transmission system and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the wireless data transmission system may be formed on one integrated circuit (IC) chip or on separate IC chips. Further, the various components of the display device may be implemented on a flexible printed circuit film, a tape carrier package (TCP), a printed circuit board (PCB), or formed on a same substrate as the display device. Further, the various components of the wireless data transmission system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for transmitting video for a display panel, the method comprising:
    receiving, by a transmitter, a frame of video data from a data source, wherein the frame of video data comprises a plurality of pixel data;
    reorganizing, by the transmitter, the frame of video data into a plurality of packets according to levels of importance of bits of the frame of video data, wherein the levels of importance of bits comprise:
        a first level of importance for a most significant bits of each pixel data; and
        a second level of importance for a least significant bits of each pixel data, wherein the first level of importance is greater than the second level of importance;
    receiving, by the transmitter, a return signal from a receiver operating on the display panel, wherein the transmitter is in electronic communication with the receiver over a wireless channel;
    generating, by the transmitter, a tag for each of the packets, the tags corresponding to different relatively levels of importance of the packets, wherein the tag of each packet corresponds to a modulation and coding scheme (MCS) value based on their corresponding level of importance and the return signal;
    performing, by the transmitter, different protection techniques for each of the packets based on the tag corresponding to each of the packets; and
    transmitting, by the transmitter, the packets and the tags to the receiver for display on the display panel such that each packet is transmitted according to the different protection techniques based on their corresponding tagging.

2. The method of claim 1, wherein the tag of each of the packets comprises adding a bit pattern indicating a relative importance level of a packet to a header of the packet.

3. The method of claim 1, wherein more important packets have a lower MCS value than less important packets.

4. The method of claim 1, wherein the tag of each packet further corresponds to a forward error correction coding rate based on their corresponding level of importance.

5. The method of claim 1, further comprising:
    packing, by the transmitter, the packets into a plurality of Aggregated MAC Protocol Data Unit (A-MPDU) subframes; and
    transmitting, by the transmitter, the A-MPDU subframes to the receiver.

6. The method of claim 5, further comprising:
    tagging, by the transmitter, a plurality of Physical Layer Convergence Procedure (PLCP) Protocol Data Unit (PPDU) frames with a same tag;
    packing, by the transmitter, the A-MPDU subframes having a same importance level into the PPDU frames; and
    transmitting, by the transmitter, the PPDU frames to the receiver.

7. The method of claim 1, further comprising selecting, by the transmitter, the different protection techniques for different regions of an image of the frame of video data according to a type of display device corresponding to the receiver.

8. A transmitter for transmitting data for a display panel, the transmitter being configured to:
    receive a frame of video data from a data source;
    reorganize the frame of video data into a plurality of packets according to levels of importance of bits of the frame of video data, wherein the levels of importance of bits of the frame of video data comprise:
        a first level of importance for a most significant bits of each pixel data; and
        a second level of importance for a least significant bits of each pixel data, wherein the first level of importance is greater than the second level of importance;
    receive, by the transmitter, a return signal from a receiver operating on the display panel, wherein the transmitter is in electronic communication with the receiver over a wireless channel;
    generate a tag for each of the packets, the tags corresponding to different relatively levels of importance of the packets, wherein the tagging of each packet corresponds to a modulation and coding scheme (MCS) value based on their corresponding level of importance and the return signal;
    perform different protection techniques for each of the packets based on the tag corresponding to each of the packets; and
    transmit the packets and the tags to the receiver for display on the display panel such that each packet is transmitted according to the different protection techniques based on their corresponding tagging.

9. The transmitter of claim 8, wherein the tagging of each of the packets comprises adding a bit pattern indicating a relative importance level of a packet to a header of the packet.

10. The transmitter of claim 8, wherein the tagging of each packet corresponds to a forward error correction coding rate based on their corresponding level of importance.

11. The transmitter of claim 8, wherein the transmitter is further configured to:
    pack the packets into a plurality of Aggregated MAC Protocol Data Unit (A-MPDU) subframes; and
    transmit the A-MPDU subframes to the receiver.

12. The transmitter of claim 11, wherein the transmitter is further configured to:
    tag a plurality of Physical Layer Convergence Procedure (PLCP) Protocol Data Unit (PPDU) frames;
    pack the A-MPDU subframes having a same importance level into the PPDU frames; and
    transmit the PPDU frames to the receiver.

13. A method for transmitting video for a display panel between a transmitter in electronic communication with a receiver over a wireless communication channel, the method comprising:
    receiving, by a transmitter, a frame of video data from a data source, wherein the frame of video data comprises a plurality of pixel data;
    reorganizing, by the transmitter, the frame of video data into a plurality of packets according to levels of importance of bits of the frame of video data, wherein the levels of importance of bits of the frame of video data comprise:
        a first level of importance for a most significant bits of each pixel data; and a second level of importance for a least significant bits of each pixel data, wherein the first level of importance is greater than the second level of importance;

generating, by the transmitter, a tag for each of the packets, the tags corresponding to different relatively levels of importance of the packets, wherein the tagging of each packet corresponds to a modulation and coding scheme (MCS) value based on their corresponding level of importance and a return signal from the receiver;

monitoring, by the transmitter, for the return signal from the receiver;

adjusting, by the transmitter, a protection technique based on a change in at least one of channel quality or video quality; and transmitting, by the transmitter, the packets and the tags to the receiver for display on the display panel such that each packet is transmitted according to the protection technique based on their corresponding tagging.

14. The method of claim 13, wherein the tag of each of the packets comprises adding a bit pattern indicating a relative importance level of a packet to a header of the packet.

15. The method of claim 13, further comprising:
packing, by the transmitter, the packets into a plurality of Aggregated MAC Protocol Data Unit (A-MPDU) subframes; and
transmitting, by the transmitter, the A-MPDU subframes to the receiver.

16. The method of claim 15, further comprising:
tagging, by the transmitter, a plurality of Physical Layer Convergence Procedure (PLCP) Protocol Data Unit (PPDU) frames with a same tag;
packing, by the transmitter, the A-MPDU subframes having a same importance level into the PPDU frames; and
transmitting, by the transmitter, the PPDU frames to the receiver.

* * * * *